United States Patent [19]

Eccardt

[11] 4,364,294

[45] Dec. 21, 1982

[54] HORIZONTAL POWER BAND SAW

[75] Inventor: Curtis J. Eccardt, St. Charles, Mo.

[73] Assignee: Emerson Electric Co., St. Louis, Mo.

[21] Appl. No.: 175,253

[22] Filed: Aug. 4, 1980

[51] Int. Cl.³ .................... B23D 53/04; B23D 55/04; B23D 55/10; B23D 55/08; B27B 13/10
[52] U.S. Cl. ..................................... 83/796; 83/799; 83/816; 83/820; 83/454; 83/455
[58] Field of Search ................. 83/796, 799, 800, 801, 83/816, 817, 802, 820, 454, 455

[56] References Cited

U.S. PATENT DOCUMENTS

| 1,360,972 | 11/1920 | Napier | 83/796 |
| 1,453,609 | 5/1923 | Stowell | 83/796 |
| 2,903,027 | 8/1959 | Edgemond et al. | 83/817 |
| 3,104,576 | 9/1963 | Robinson | 83/820 |
| 3,465,628 | 9/1969 | Komendowski et al. | 83/801 |
| 3,504,585 | 4/1970 | Harris | 83/801 |
| 3,830,131 | 8/1974 | Wells | 83/820 |
| 3,862,583 | 1/1975 | Tsuchiya | 83/796 |

FOREIGN PATENT DOCUMENTS 436506 1/1912 France ................................. 83/799

Primary Examiner—Donald R. Schran

Attorney, Agent, or Firm—Polster, Polster & Lucchesi

[57] ABSTRACT

A horizontal power band saw having a frame fabricated of rigid weldments (as opposed to castings) thereby to appreciably lower the cost of the band saw. A system is disclosed for accurately pivotally mounting the saw head on the saw bed, for adjusting the pivotal axis of the head parallel to the bed, and for positively holding the head in desired relation with the bed so as to enable the head to be repeatedly and accurately raised and lowered while the blade of the saw is held in a plane generally perpendicular to the bed. The saw blade is tensioned in such a manner that a desired tension load can be accurately applied to the blade and so that the tension load on the blade can be accurately read out. Also disclosed is the provision of guides for holding the blade in a desired cutting orientation with the guides including guide rollers, thrust bearings, and carbide blade guide inserts wherein the rollers, bearings, and inserts may be readily and accurately adjusted so as to accurately guide and hold saw blades of varying thicknesses. Further the band saw includes a quick-acting vise enabling the saw operator to quickly release a work piece and to positively grip the work piece in another position along its length so as to enable repeated cuts on the work piece to be accurately and rapidly accomplished.

24 Claims, 14 Drawing Figures

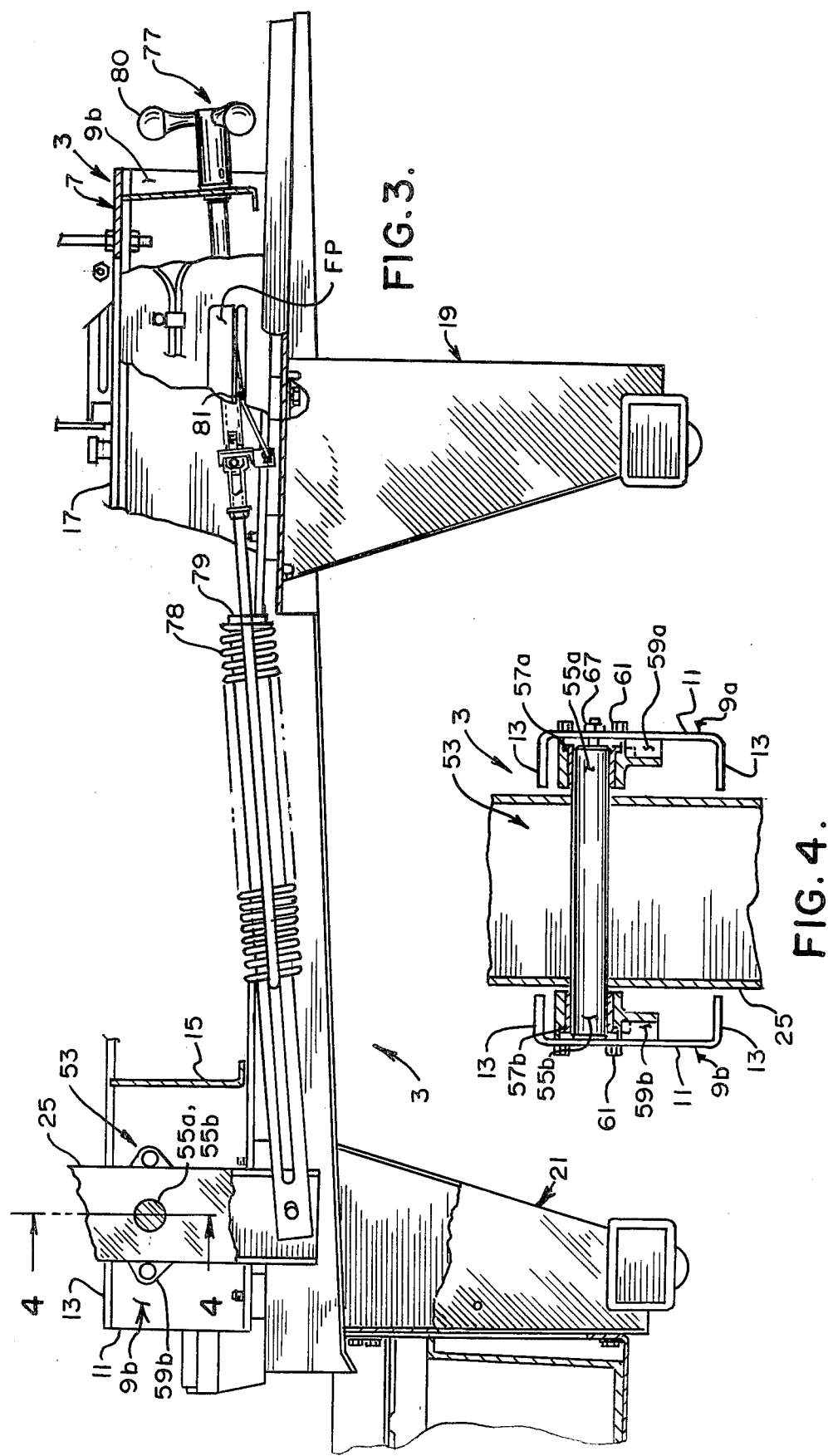

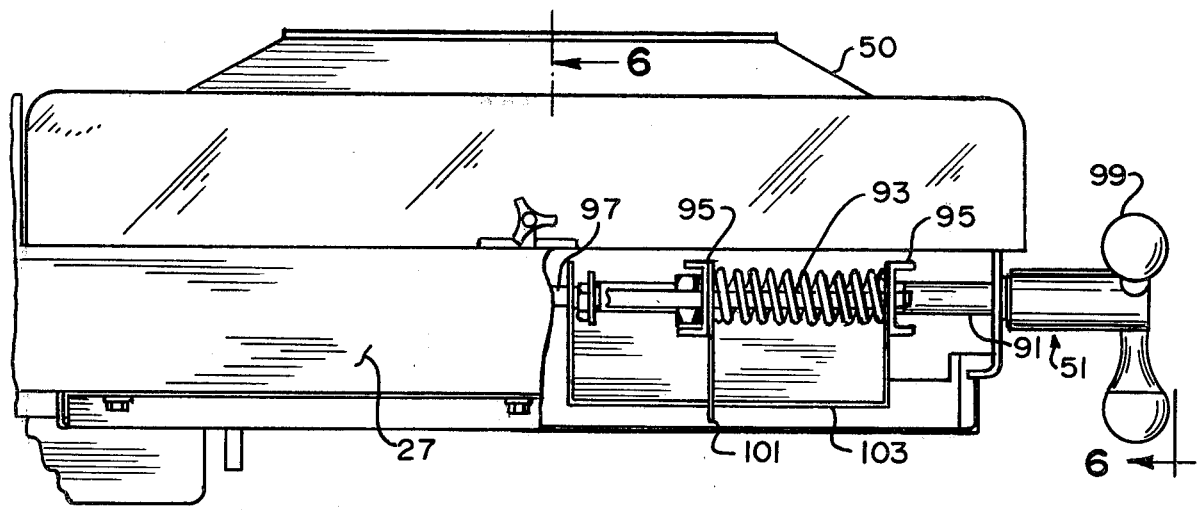
FIG.5.
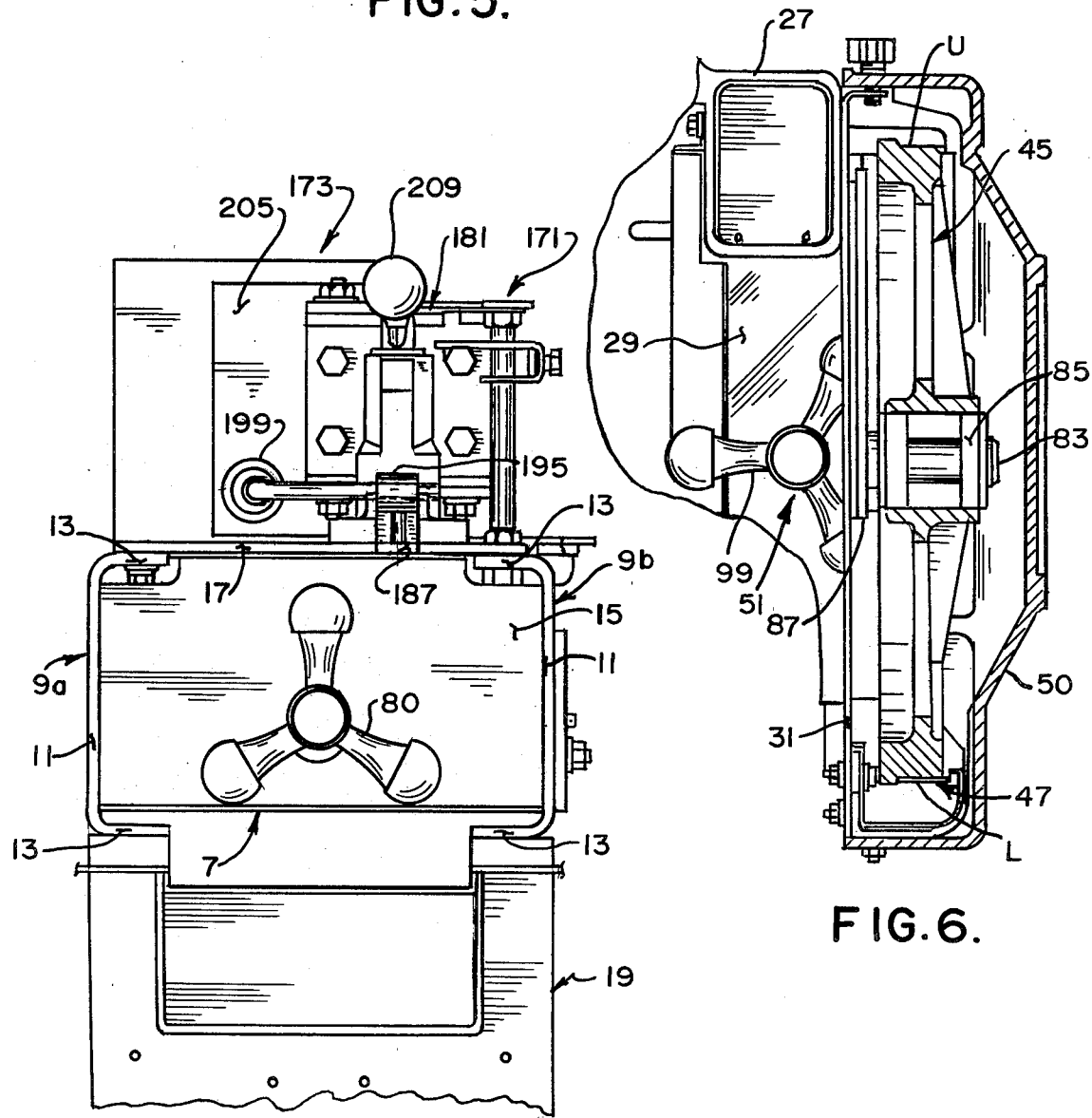
FIG.8.
FIG.6.

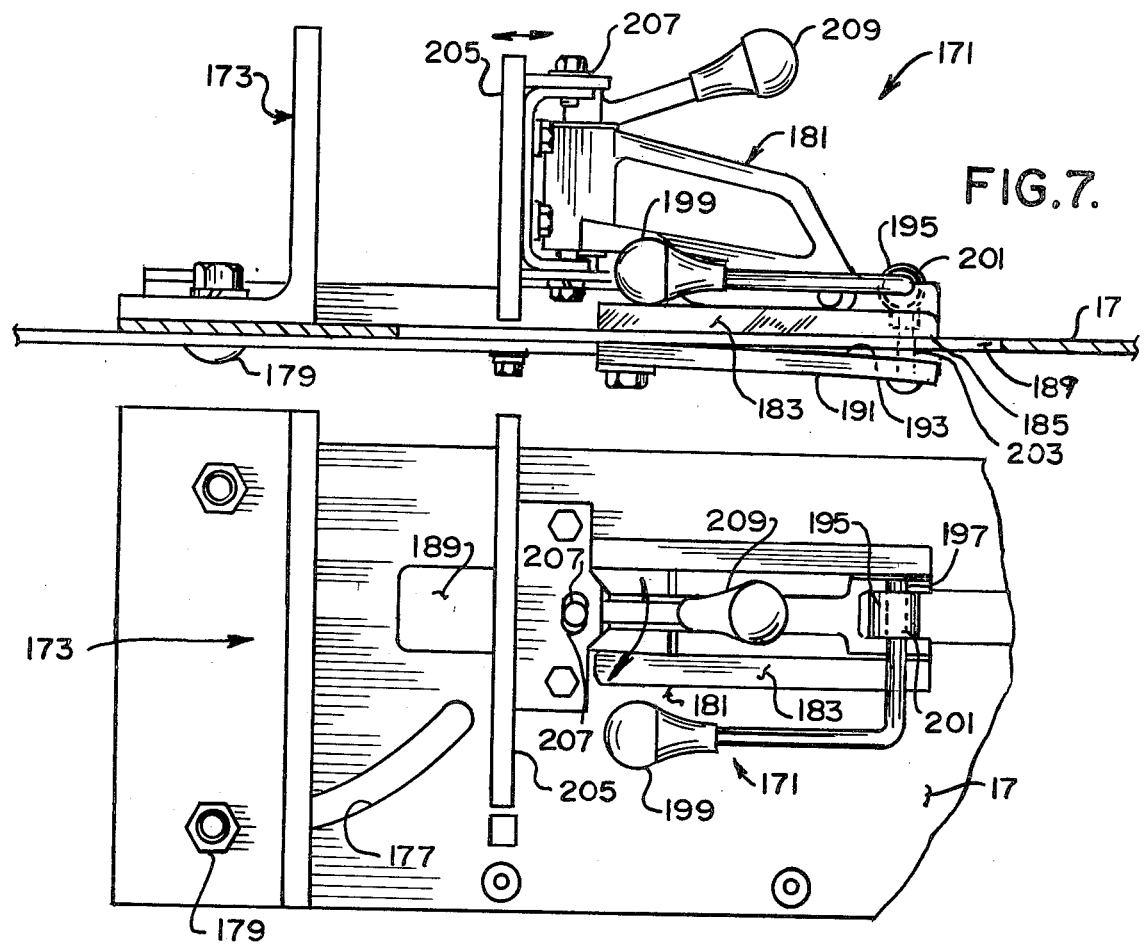
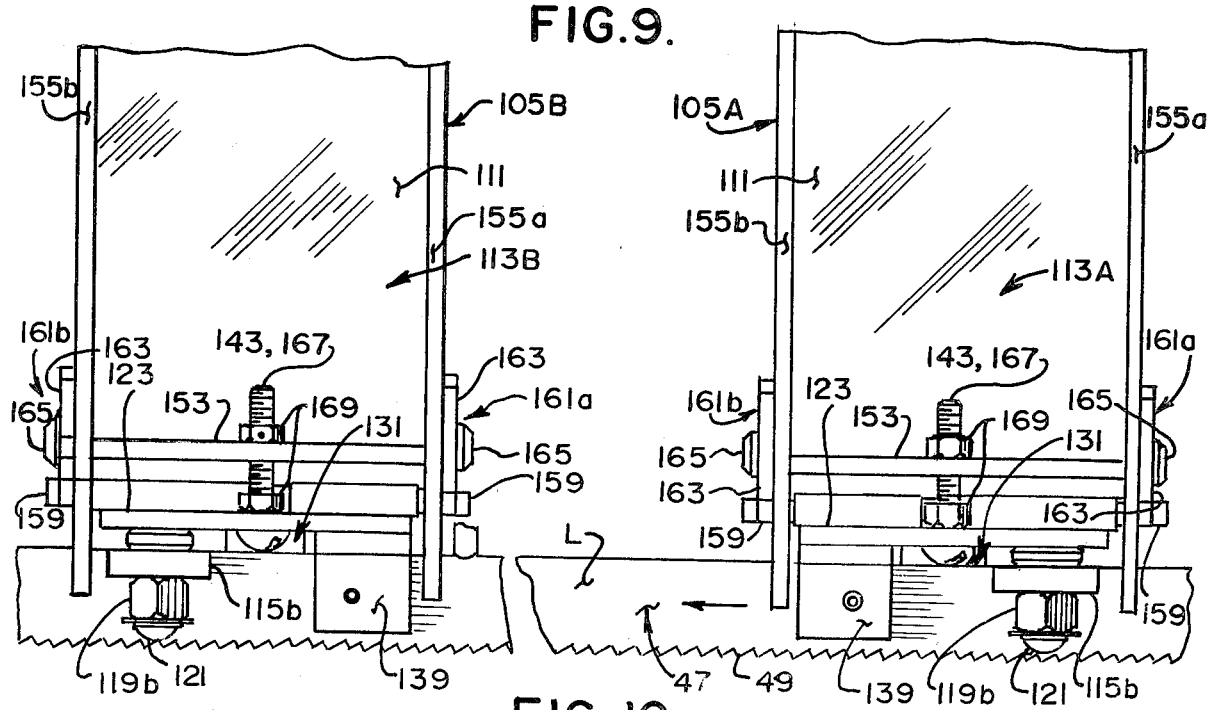

HORIZONTAL POWER BAND SAW

BACKGROUND OF THE INVENTION

This invention relates to a horizontal power band saw, such as may be used for cutting metal stock (e.g. bar stock, pipe, or structural shapes) to a desired length.

Generally, a horizontal powered band saw includes a bed supported on legs and a head pivotally mounted with respect to the bed for swinging between a raised, retracted position and a lowered sawing position. The head has a pair of spaced blade wheels journalled thereon with an endless band saw blade entrained around the blade wheels. A vise is typically provided on the bed for holding the work to be cut. The band saw blade typically has a cutting edge along one side thereof and the head includes blade guides engagable with one reach of the blade (the lower reach toward the bed when the head is lowered) for twisting the blade so that the cutting edge of the blade between the blade guides is disposed toward the work and for twisting the blade in reverse direction so that the blade may be engaged by the blade wheels. Conventionally, the blade drive wheel is driven by a variable speed drive and motor and the other blade wheel, the idler wheel, is journalled on an axel slidable on the head toward and away from the drive wheel for tensioning the blade.

Desirably, the endless band saw blade should be tensioned so as to remain taut as it cuts through the work. This tension load should be sufficiently high so as to insure straight cuts through the work, but not so high as to break the blade. The tension load on the blade will vary from blade-to-blade, depending on the width, thickness, type of blade, and the material from which the blade is fabricated. By insuring that a proper tension preload is placed on the blade, the service life of the blade can be enhanced. Further, it is neccessary for the idler wheel to be adjustable so as to compensate between blades of various length. Heretofore, it has been difficult to insure that a desired preload is applied to the blade.

Prior horizontal power band saws typically utilize rigid castings to form all or part of the bed and the frame for the head. While these prior band saws constructed of these castings were highly rigid, they were costly to manufacture.

As mentioned above, horizontal band saws conventionally included a pair of spaced blade guides for twisting the lower reach of the band saw blade so as to orient its cutting edge toward the work and to accurately hold the blade as it cuts through the work. Prior blade guides oftentimes included guide rollers, or friction carbide inserts for twisting and holding the blade and thrust bearings for transferring the cutting thrust from the blade to the head. However, with prior horizontal band saws it was sometimes difficult to adjust the rollers, thrust bearings and inserts so as to properly engage the blade, or upon changing from one blade to another of different thicknesses or widths.

Further, the work holding vises of prior art horizontal power band saws typically included a fixed jaw and a movable jaw manually movable toward and away from the fixed jaw on the bed of the saw. The jaw could be moved between an open and closed position by rotating the vise screw. However, in utilizing the band saws to repeatedly cut off lengths of structural members or bar stock material, the manual manipulation of the vise was a relatively time consuming operation and thus contributed to relatively long cycle times to cut consecutive lengths.

Among the several objects and features of the present invention may be noted the provision of a horizontal power metal cutting band saw, such as described above, having a frame fabricated from rolled structural elements welded together to form weldments (as opposed to castings) with the frame having sufficient rigidity and strength for accurate cuts and long service life;

the provision of band saw which is of economical construction and which requires less tooling costs for manufacture than prior art band saws;

the provision of such a band saw which is relatively easy to manufacture and service;

the provision of such a band saw in which a predetermined tension load may be readily and accurately applied to band saw blades of varying lengths and types thereby to enhance cuts made by the blades and to enhance the blade life;

the provision of such a band saw in which the saw controls, including the feed rate and feed pressure of the saw, are readily accessible by an operator;

the provision of such a band saw utilizing formed structural elements for its frame in which the head of the saw is accurately and rigidly pivotally secured to the bed of the saw and yet in which the pivotal connection of the head to the bed is adjustable so as to enable accurate alignment of the head to the bed and so that the head is positively held in its aligned position in respect to the bed;

the provision of such a band saw having a quick-acting work-holding vise which may be readily and conveniently manually operated by the saw operator so as to effect the rapid release and gripping of a work piece upon repeated cuts being made on the work piece;

the provision of such a band saw in which the speed of the saw blade may be readily varied;

the provision of such a band saw having blade guides which may be readily and accurately adjusted so as to properly support and guide blades of varying thicknesses;

the provision of such a band saw which accurately supports the blade while sawing; and the provision of such a band saw which can accommodate stock of relatively large size.

Other objects and features of this invention will be in part apparent and in part pointed out hereinafter.

SUMMARY OF THE INVENTION

Briefly stated, this invention relates to a horizontal, power band saw for cutting metal or the like. The band saw comprises a frame including a bed, legs supporting the bed, and a head assembly pivotally carried by the bed at one end thereof for swinging in a generally vertical direction between a raised position and a lowered position. The head includes a pair of spaced blade wheels rotatably mounted thereon, and an endless blade entrained around the wheels, the blade having a cutting surface along one edge thereof and an upper and lower reach extending between the wheels. Guide means are provided on the head engagable with the lower reach of the blade for twisting the blade thereby to dispose its cutting edge for cutting a work piece supported on the bed below the head. Further, means is provided for driving the blade around an endless path. Specifically, the improvement of this invention relates to the bed being constituted by a pair of parallel, spaced, horizontal channel members substantially the length of the bed, each of the channel members having a generally vertical web and horizontal flanges at the top and bottom of the web with the flanges of the channel members facing each other. The head comprises a head post and a head beam generally perpendicular to the head post. The bed channel members are spaced apart a distance sufficient to receive the lower end of the head post therebetween. Further, means is provided for pivotally mounting the head post relative to the channel members for pivotal movement of the head about a horizontal axis as it is rotated between its raised and lowered positions.

BRIEF DESCRIPTION OF THE DRAWINGS

FIG. 3 is an enlarged longitudinal cross sectional view of the bed of the power band saw illustrating certain details of construction of the bed;

FIG. 4 is an enlarged vertical cross sectional view taken along line 4—4 of FIG. 3 illustrating means for pivotally connecting the head on the band saw to the bed;

FIG. 5 is an enlarged top plan view of the outer end of the head with some parts broken away in cross section to illustrate means for applying a predetermined tension load to the blade of the band saw;

FIG. 6 is a vertical cross sectional view taken along line 6—6 of FIG. 5 further illustrating details of the above-mentioned blade tensioning means;

FIG. 7 is an enlarged side elevational view of a work holding vise mounted on the bed of the saw;

FIG. 8 is an outer end view of the bed of the band saw illustrating the disposition of elongate channel members constituting the frame of the bed and illustrating the end elevational view of the above-noted work holding vise;

FIG. 9 is a plan view of the work holding vise as it is mounted on the bed of the saw;

FIG. 10 is an enlarged side elevational view of a pair of blade guides carried by the saw head engagable with the lower reach of the band saw blade for twisting the blade thereby to orient its cutting edge toward the work piece and for holding and guiding the blade as the blade cuts through the work piece;

Corresponding reference characters indicate corresponding parts throughout the several views of the drawings.

DESCRIPTION OF PREFERRED EMBODIMENTS

Figure 1:
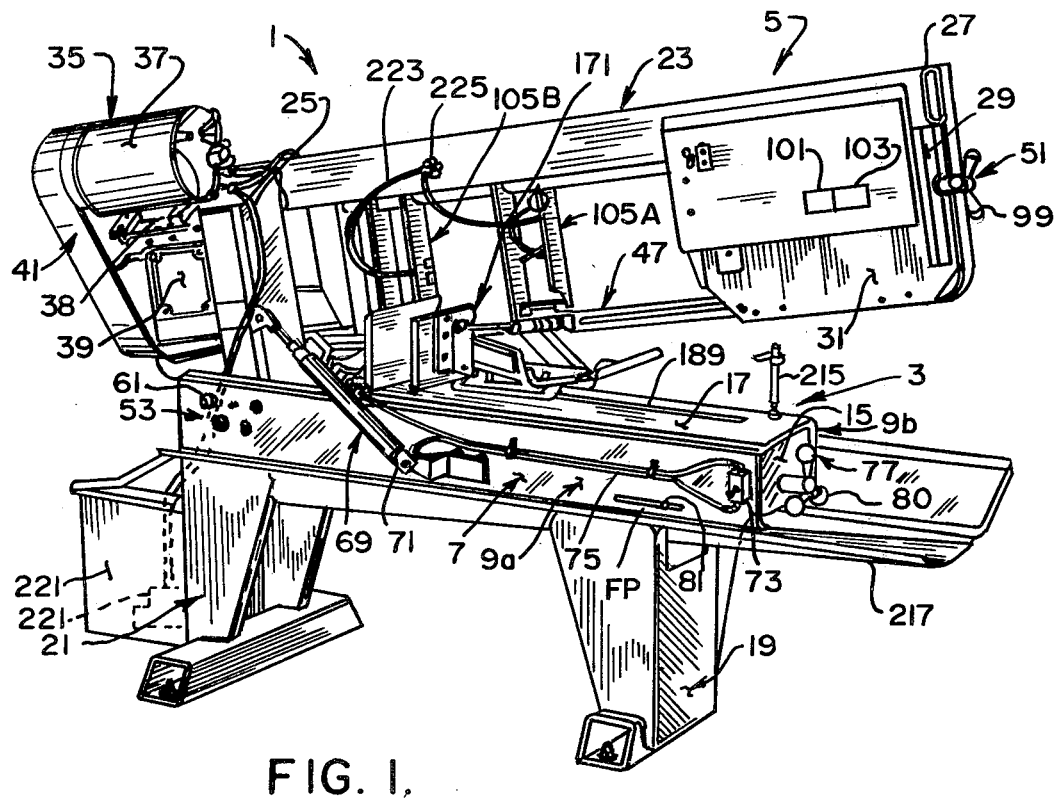
FIG. 1 is a front perspective view of a horizontal power band saw of the present invention illustrating its frame fabricated from weldments with the head of the band saw in its raised position.
Figure 2:
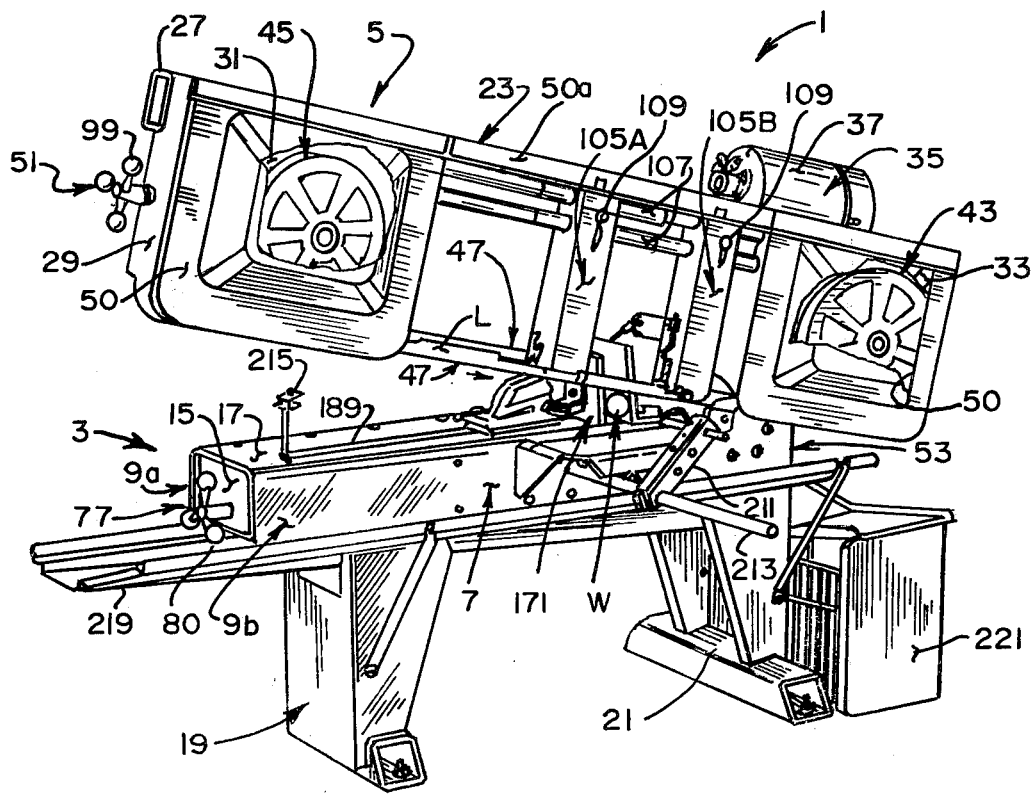
FIG. 2 is a perspective view of the backside of the band saw illustrated in FIG. 1.

Referring now to the drawings, a horizontal, power band saw of the present invention is indicated in its entirety by reference character 1. The band saw is shown to comprise a bed 3 having a head 5 pivotally mounted at one end of the bed for swinging in a generally vertical plane between a retracted position (as shown in FIGS. 1 and 2) in which the blade of the band saw is clear of a work piece W supported on the bed and a lowered cutting position in which the blade is in cutting engagement with the work piece.

More specifically, bed 3 includes a bed weldment, as indicated at 7, constituted by a pair of elongate bed channel members 9a, 9b extending substantially the full length of the bed. Each of the bed channel members includes a generally vertical web 11 and horizontal flanges 13 at the top and bottom of the web. The bed channels 9a, 9b are arranged with their webs 11 vertical and with their flanges 13 facing inwardly to one another (see FIG. 8). The bed channels are parallel to one another and are spaced apart a predetermined distance and are fixedly held in space relation by means of gussets 15 rigidly secured (welded) between the inner faces of webs 11. Further, a horizontal bed plate 17 is rigidly secured (e.g., bolted) to the upper faces of the upper flanges 13 of the channels thereby to constitute a horizontal surface for supporting work piece W in a manner as will appear.

Bed weldment 17 is supported in a desired horizontal position above the floor by means of a front leg weldment, as generally indicated at 19, and a rear leg weldment 21. As is best shown in FIGS. 1 and 2, the front and rear leg weldments comprise a horizontal support at the bottom of the leg weldments with formed sheet metal legs welded to the floor members and extending upwardly for being preferably removably secured (e.g., bolted) to bed weldment 7.

Head 5 is shown to comprise a rigid head weldment 23 including a head post 25 welded to a perpendicular head beam 27 with the head beam extending outwardly from the head post. Head post 25 is shown preferably to be of structural steel tubing of square or rectangular cross section. Likewise, head beam 27 is shown to be a length of structural steel rectangular tubing. A bracket leg 29 is welded to the outer end of head beam 27 and extends downwardly therefrom. An outer support plate 31 (see FIGS. 6 and 13) is rigidly secured to the outer end of head beam 27 and to bracket arm 29 and a similar inner support plate 33 (see FIG. 2) is secured to the inner end of the head beam adjacent head post 25.

A drive for the saw, indicated in its entirety at 35 in FIG. 1, is shown to comprise an electric motor 37 mounted on a plate 38 pivotally mounted on head beam 27 and a transmission 39. A multi-speed belt and pulley drive, as generally indicated at 41, interconnects the output shaft of motor 37 and the input shaft of transmission 39 for driving the saw at any one of a number of preselected speeds as determined by the belt position on the multi-speed belt and pulley drive in a manner as well known to those skilled in the art.

A drive blade wheel 43 is rotatably mounted on and is driven by the output shaft of transmission 39. An idler blade wheel 45 is journalled on the outer of head 5 in an manner as will appear. An endless band saw blade, as generally indicated at 47, is entrained around drive wheel 43 and idler wheel 45 and is shown to have upper and lower reaches, as indicated at U and L in FIG. 2. Further, as is conventional, band saw blade 47 has a cutting edge 49 (see FIG. 10) for cutting work piece W when the head is in its lowered cutting position. As best shown in FIG. 2, wheel covers 50 are hingedly carried by the head enclose the blade wheels when in operation and a stationary blade cover 50a encloses the upper reach of the blade extending between the front and rear wheel covers.

In accordance with this invention, tensioning means, as generally indicated at 51, is provided on the outer end of head 5 for applying a predetermined tension load to blade 47. The details of blade tensioning means 51 will be disclosed in detail hereinafter.

It is a principal object of the horizontal power band saw of the present invention to provide a construction for the band saw frame which enables the bed and the head to be fabricated from rolled, structural steel members (e.g., bed channels 9a, 9b and head beam 27) and yet, in operation, to compare favorably with the rigid cast iron castings heretofore utilized in the construction of conventional horizontal band saws. To accomplish this end, in accordance with this invention, means, as generally indicated at 53, is provided for adjustably and positively rotatably mounting head 5 with respect to bed 3 in such manner that the head is accurately guided and that the portion of the blade guides (as will be hereinafter disclosed) is held in a plane perpendicular to the surface of bed 3 as the head rotates or pivots relative to the bed between its raised and lowered positions.

Referring now to FIGS. 1, 3, 4, and 14, the construction of mounting means 53 will be more specifically described. As noted above, bed channels 9a, 9b are spaced apart a distance generally corresponding to the width of head post 25 for receiving the head post therebetween such as is shown in FIGS. 3 and 4. The head post has a shaft rigidly secured thereto extending through the head post from one side thereof to the other with the ends of the shaft protruding out beyond the sides of the head post so as to constitute trunions 55a, 55b. Respective bushings 57a, 57b receive respective trunions 55a, 55b and journal the trunions in respective bearing support castings 59a, 59b. The bearing castings are secured to the inner faces of channel webs 11 by means of bolts 61 extending through the castings and through corresponding holes provided in the webs of channel members 9a, 9b. More specifically, one of the holes in the channel web, as indicated at 63, is sized to have a relatively close fit with the shank of its respective bolt 61 while the remaining three holes, as indicated at 65, are oversized thereby to permit adjustment of the bearing support casting relative to the channel members thereby to permit adjustment of head 5 relative to the base and to properly align the rotational axis of trunions 55a, 55b with respect to the bed. Specifically, by loosening bolts 61 inserted through oversize holes 65, the respective bearing support castings 59a, 59b may be adjustably moved independently of one another on bed channels 9a, 9b thereby to insure that the rotational axis of the trunions is parallel to the work surface of bed plate 17 and so that the vertical rotational plane of head 5 is parallel to longitudinal plane of bed 3. With the head in a desired adjusted position relative to the bed, bolts 61 may be tightened to a predetermined torque level thereby to positively lock the bearing support castings 59a, 59b to their respective bed channels 9a, 9b and thus fixedly secure the location of the pivot axis of head 5 relative to the bed. Further in accordance with this invention, a set screw 67 (see FIG. 4) is carried by one of the bed channel members (e.g., channel member 9a) for being threadably inserted through the channel member so as to abut the outer end of its respective trunion 55a thereby to force the trunion (and thus head post 25b) toward the other bed channel thereby to effectively eliminate end play (e.g., side-to-side movement) of the head relative to the bed.

Referring now to FIG. 1, means, as generally indicated at 69, is provided for varying or controlling the downward feed rate of head 5 relative to bed 3 during cutting of work piece W is provided. Specifically, this feed rate control means includes the provision of a feed rate hydraulic cylinder unit 71 interconnected between bed channel 9a and head post 25 at a location on the head post above the pivotal axis of trunions 55a, 55b. The feed rate cylinder 71 is filled with a suitable hydraulic fluid and the outlet ports at the end of the cylinder unit are interconnected to a control valve 73 by means of suitable hydraulic tubing 75. Thus, by selectively opening and closing rate control valve 73, the rate at which head 5 is lowered toward bed 3 may be readily controlled. Upon closing of the feed rate control valve, head 5 may effectively be locked at any desired angled position relative to the bed.

Referring now to FIG. 3, means, as generally indicated at 77, is provided for counter balancing head 5 and for adjusting the feed pressure of the lower reach of blade 47 cuttingly engaging work piece W. As shown in FIG. 3, this feed pressure adjustment means 77 comprises a compression coil spring 78 interposed in a threaded adjustment linkage 79 between one of the end gussets 15 of bed weldment 7 and the lower end of head post 25 below the level of trunions 55a, 55b for applying a resilient biasing force to the head counterbalancing at least in part the weight of the head which tends to rotate the head about the trunions 55a, 55b downwardly toward bed 3. The feed rate pressure may be selectively, manually adjusted by means of a knob 80 at the front end of bed 3 which in turn actuates linkage 79 so as to compress or relax spring 78. A feed pressure indicator 81 and scale FP (see FIG. 1) is provided along web 11 of bed channel 9a so that the feed pressure counterbalancing the head may be directly read out. This indicator utilizes the compression of spring 78 to indicate the counter balance force.

Figure 13:
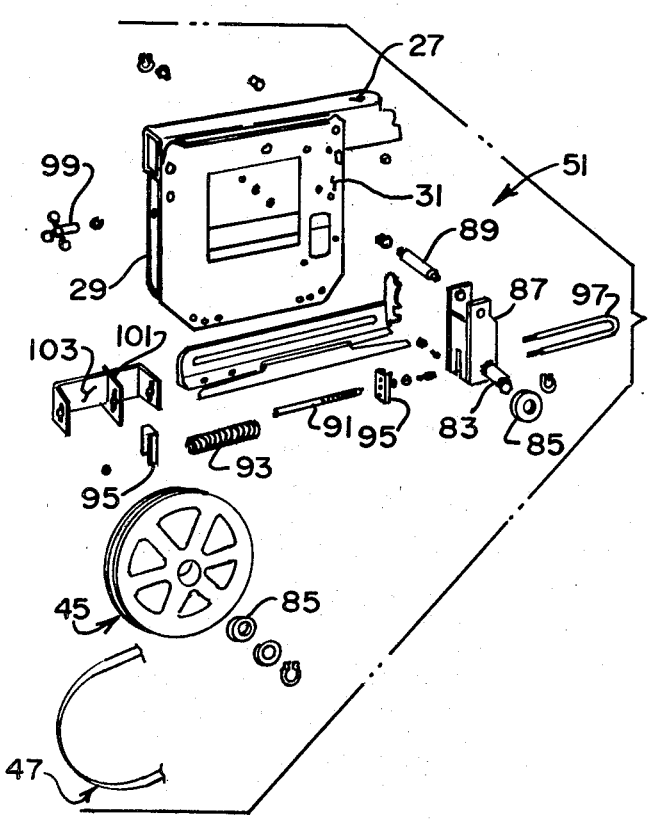
FIG. 13 is an exploded perspective view of the outer end of the band saw head illustrating parts constituting the above-mentioned blade tensioning means.
Figure 14:
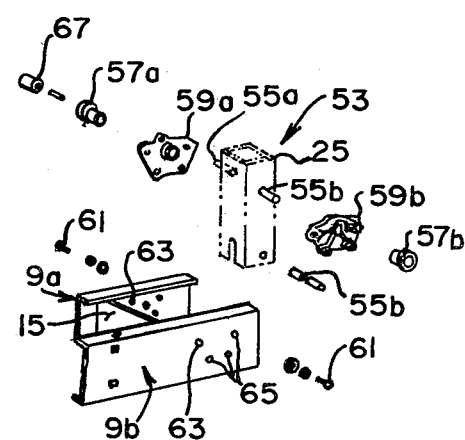
FIG. 14 is an exploded perspective view of the above-noted means for pivotal securement of the head of the band saw to be bed.

Referring now to FIGS. 5, 6 and 13, blade tensioning means 51 will now be described in greater detail. Idler blade wheel 45 is shown to be rotatably mounted or journalled on idler wheel axle 83 by means of suitable bearings 85. Idler wheel axle 83 is shown to be cantilevered outwardly from one face of an idler wheel yoke 87. Preferably, this yoke is a weldment formed of rolled plate steel or the like, and the yoke is pivotally supported relative to head beam 27 by means of a pivot pin 89. A threaded rod 91 is interconnected to idler wheel yoke 87 by means of a compression coil spring 93. More specifically, the compression coil spring is held captive between spring compression elements 95 at each end thereof and the compression elements are connected to the idler yoke by means of a U-bolt 97. An adjustment knob 99 on the outer end of threaded 91 is provided for turning the threaded rod 91 and thus compressing or relaxing the spring between spring compression members 95.

In accordance with this invention, a blade tension indicator 101 (see FIGS. 1 and 13) is carried by spring 93 thereby to visually indicate the tension load applied to blade 47. Tension indicator 101 is movable relative to a force read-out scale 103 provided on head 5 thereby to permit the saw operator to directly read out the tension preload force applied to the band saw blade. By enabling the saw operator to read directly the tension force applied to the blade, a desired preload force may readily be applied to the blade regardless of changes in length upon changing from one blade to another and regardless of the position of the idler wheel as it swings on idler wheel yoke 87 toward and away from drive wheel 43. It can also be readily determined if, after a period of time, the saw blade has relaxed and thus allowed the desired tension preload to drop off.

Referring now to FIGS. 1, 2 and 10-12, power band saw 1 is shown to further include a pair of leading and trailing blade guides, as respectively indicated at 105A, 105B, engageable with the lower reach L of blade 47 as the lower reach of the blade is entrained off the lower periphery of idler wheel 45 and moves toward the bottom of drive wheel 43. Blade guides 105A, 105B are slidable along a pair of parallel bar tracks 107 (see FIG. 2) in a direction generally parallel to the lower reach of the blade and each may be selectively locked in place at any desired position along the length of bar tracks 107 by means of clamps 109 carried by each of the blade guides.

Figure 11:
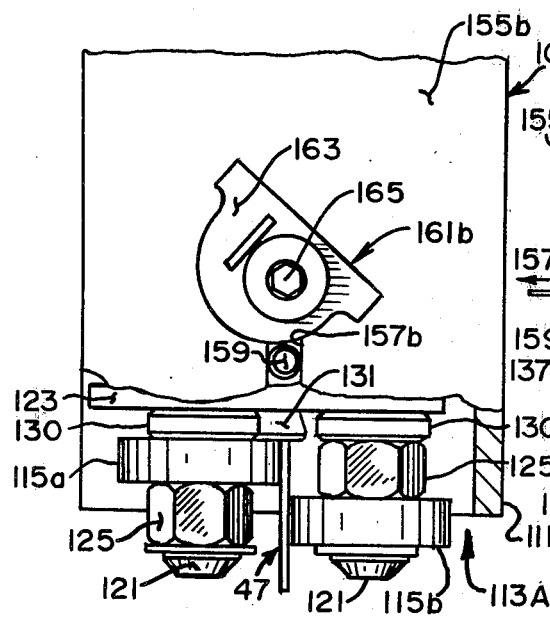
FIG. 11 is an elevational view of the left end of the left blade guide illustrated in FIG. 10 with portions of blade holding housing or channel broken away for purposes of illustration.
Figure 12:
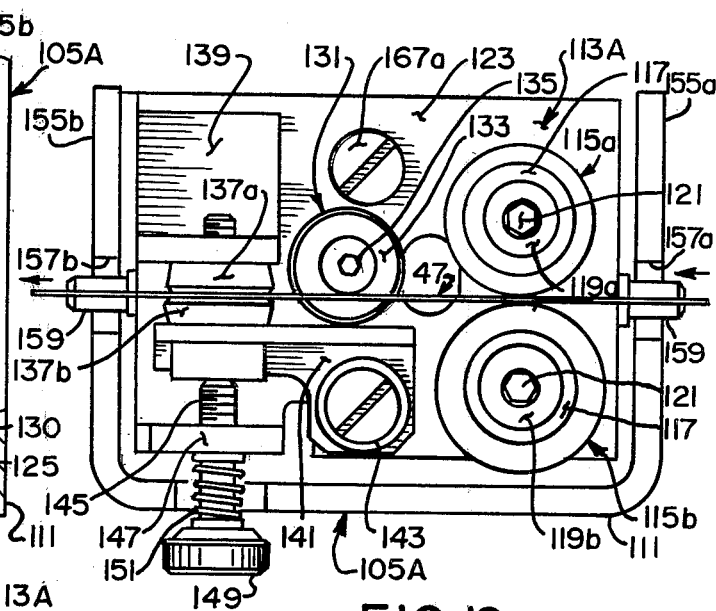
FIG. 12 is a bottom plan view of one of the blade guides.

Each of the blade guides 105A, 105B is substantially identical to one another (see FIG. 10) and thus only blade guide 105A will be discussed in detail, realizing that the guide 105B is, in essence, a mirror image of the trailing guide. Referring now to FIGS. 10-12 and specifically to blade guide 105A, this blade guide is shown to comprise a blade guide housing or channel 111 which is open along one side face thereof and which has an open, hollow, lower end. As generally indicated at 113A, 113B, each of the blade guides 105A, 105B includes blade twisting and guide means which is constituted by a pair of guide rollers 115a, 115b disposed on opposite side of blade 47 for rolling engagement with the blade as the blade moves pass the blade guides. Each of the guide rollers is journalled on a respective ball bearing, as indicated at 117, and each is mounted on a respective eccentric bushing 119a, 119b for adjustably moving the rollers toward and away from the blade. However, the position of roller 115a (referred to as a stationary roller) is preset and need not be adjusted. Roller 115b (referred to as a movable roller) is adjustably movable on its eccentric bushing 119b for accommodating blades of varying thickness. Stationary guide roller 115a is stationarily mounted with respect to the blade guide housing 111 by means of a bolt 121 through its bushing 119a. Bolt 121 is threaded into a mounting plate 123. Movable guide roller 115b is mounted on mounting plate 123 by a respective bolt 127. As best noted in FIG. 11, spacers 125 and 130 are provided for guide rollers 115a and 115b so that the guide roller 115a is rollingly engagable with the top marginal edge of saw blade 47 and so that the roller 115b is engageable with the mid portion of the saw blade at a location somewhat below the location of stationary drive wheel. It will be appreciated that as saw blade 47 travels from idler wheel 45 toward leading blade guide 105A that the pair of guide rollers 115a, 115b on blade guide 105A effects twisting of the lower reach of the blade through an angle of approximately 90° thereby to orient cutting edge 49 of the blade downwardly toward work piece W disposed in bed 3 of the band saw for cutting of the work piece.

Further, blade guide 105A is shown to comprise a non-rotatable thrust bearing, as generally indicated at 131, engageable with the upper edge of saw blade 47 opposite its cutting edge 49 for transferring cutting forces from the blade to the blade guide. Thrust bearing 131 is shown to comprise a carbide thrust insert 133 engagable with the top edge of the saw blade. As is best shown in FIG. 12, a mounting bolt 135 disposed on the same side of blade 47 as stationary guide roller 115a mounts thrust insert 133 on plate 123.

Further, guide assembly 105A is shown to comprise a pair of blade guide inserts as indicated at 137a, 137b for frictional engagement of opposite sides of the saw blade thereby to positively hold the saw blade in a desired orientation (or at a desired angle) as the saw blade leaves the leading blade guide 105A for engagement with the work piece, and, in the case of trailing guide 105B, to hold the saw blade in a desired orientation or angle as the saw blade exits its cut in the work piece. In accordance with this invention, blade guide insert 137a is preferably stationarily mounted with respect to mounting plate 123 and blade guide insert 137b is adjustably movable on the mounting plate for movement toward and away from the stationary blade guide insert in a manner as will appear for accommodating various thicknesses of saw blades 47. Specifically, stationary guide insert 137a is threadably mounted on a fixed bracket 139 secured (e.g., welded) to the bottom face of mounting plate 123. As indicated at 141, a swing bracket is provided for adjustable or movable blade guide 137b, this swing bracket being pivotally mounted on a bolt 143 carried by mounting plate 123. Thus, upon swinging of the mounting bracket relative to mounting plate 123, the adjustable blade guide insert 137b may be swung toward and away from stationary insert 137a and toward and away from blade 47. An adjustment bolt 145 for the movable blade guide insert is threadably mounted in a flange 147 bent down from mounting plate 123. An adjustment knob 149 is carried on the other end of the adjustment bolt and is readily accessible from the exterior of blade guide housing 111 for ready adjustment by the saw operator so as to insure that the blade is positively frictionally engaged by both of the blade guide inserts, but yet such that the blade guide inserts do not exert excessive frictional drag on the saw blade. A compression coil spring 151 is disposed between bracket 147 and knob 149 thereby to frictionally hold bolt 145 in a desired adjusted position. It is preferred that blade guide inserts 137a, 137b be formed of suitable carbide material so as to insure long wear of the inserts.

As best shown in FIG. 10, a stationary support plate 153 is welded in place within guide channel 111 of each blade guide 105A, 105B above the level of mounting plate 123. Further, each guide channel 111 includes the front and rear faces 155a, 155b, respectively, and each of these faces of the guide channel includes a respective blind slot 157a, 157b (see FIGS. 11 and 12) in the leading and trailing faces of the guide channel. As indicated at 159, a shaft is rigidly secured to the upper face of mounting plate 123 and the ends of shaft 159 extend out beyond the ends of plate 123 and are received in respective end face slots 157a, 157b in the leading and trailing end faces of the guide channel. On each end face of the guide channel, a respective eccentric adjustment cam 161a, 161b is provided for heightwise adjustment of mounting plate 123 (and hence for heightwise adjustment of guide rollers 115a, 115b, thrust insert 131, and blade guide inserts 137a, 137b) thereby to accommodate manufacturing allowances in blade location. Specifically, each eccentric cam, 161a, 161b includes an eccentric cam plate 163 rotatably mounted by a bolt 165 on its respective end face 155a, 155b of the guide channel. The outer peripheral edge of the eccentric cam surface 163 cammingly engagable with a respective outer end of shaft 159 which protrudes out through blind slots 157a, 157b. By adjusting the eccentric cams so that the outer periphery of cam member 163 is engagable with its respective end of shaft 159, mounting plate 123 together with the various blade guide means thereon is fixed in heightwise direction relative to the blade and the blade guide. Upon tightening bolts 165, the eccentric cam members 163 may be positively locked in place. It will be appreciated that by independently adjusting eccentric cams 161a, 161, the height and angle of mounting plate 123 at each end thereof may be adjusted with respect to its channel guide 111. Further, since rollers 115a, 115b, inserts 137a, 137b and thrust insert 133 are all mounted on plate 123, all of these components move as a unit and remain in optimum relative position upon moving thrust insert to properly engage the upper edge of the saw blade.

Further, it will be appreciated that mounting plate 123 together with various blade guide means secured to the bottom face thereof may be rotated relative to guide channel 111 about the longitudinal axis of shaft 159 for changing the angle at which the various blade guide means engage and hold saw blade 47. A pair of lock bolts are provided on opposite sides of shaft 159 for engagement with stationary plate 153 thereby to positively hold the mounting in any desired position with respect to guide channel 111. Specifically, these are constituted by a lock bolt or stud 167 and by pivot bolt 143 which extend up through mounting plate 123 and through a corresponding opening (not shown) in stationary plate 153. Jam nuts 169 are threaded on stud 167 and bolt 141 for engagement with the upper face of plate 153 and mounting plate 123 thereby to fixedly hold the mounting plate in a desired angular position with respect to the stationary plate. Additionally, conventional coolant tubings may be provided in guide assemblies 105A, 105B for applying coolant to blade 47 as it cuts through the work piece.

Referring now to FIGS. 7-9, a work holding vise, as generally indicated at 171, is provided on bed 3 for gripping and holding work piece W as the latter is cut by blade 47. More specifically, vise 171 is shown to comprise a fixed jaw 173 fixedly held in place on bed plate 17. Even more specifically, fixed jaw 173 is bolted to the bed plate by means of a pivot bolt 175 (see FIG. 9) whereby the fixed jaw may angularly rotate on the bed plate about pivot bolt 175. An arcuate slot 177 is provided in bed plate 17, the arcuate slot having its center coaxial with the axis of pivot bolt 175. Further, fixed jaw 173 carries a clamp bolt 179 engagable with the portions of bed plate 17 defining arcuate slot 177 so that the fixed jaw may be pivoted on bolt 175 and clamped to the bed plate at any desired angular position along the arcuate slot.

Further, vise 171 includes a movable jaw 181 having a jaw base 183 with the latter having a bottom surface slidable on the upper surface of bed plate 17. Jaw base 183 includes a guide flange 185 projecting downwardly from its bottom for being received in an elongate slot 189 provided in bed plate 17. As best shown in FIG. 1, slot 189 extends longitudinally of the bed plate in a direction generally parallel to the direction of travel of the lower reach of blade 47. Movable jaw 181 further includes a clamp plate 191 carried on the bottom of jaw base 83 below the bed plate, the clamp plate having a curved clamping surface 193 clampingly engagable with the bottom face of the bed plate on opposite sides of slot 189 for clampingly engaging the bed plate and for fixedly locking the movable jaw at any desired position along the length of slot 189. The movable jaw further includes an eccentric locking cam 195 carried on the outer end of jaw base 183. This eccentric locking cam assembly includes a horizontal shaft 197 journalled on the outer end of the jaw base and a handle 199 secured to shaft 197 vertically rotatable between an unclamped and a clamped position. An eccentric bushing 201 is rotatably carried on horizontal shaft 197 and a link 203 interconnects eccentric bushing 201 and the outer end of clamp plate 191. Upon moving handle 199 from its unclamped position to its clamped position, eccentric bushing 201 draws link 203 and thus the outer end of clamp plate upwardly so that the curved bottom face 193 of the clamp plate clampingly engages the bottom surface of bed plate 17. It will be understood that the curved bottom surface 193 of the clamp plate aid in clamping the movable jaw relative to the bed plate by increasing clamping pressure upon operation of handle 199.

Further, movable jaw 181 includes a jaw element 205 movable with respect to jaw base 183 between a retracted position and locking position. Jaw element 205 is movable between its retracted and locked position by means of a rotary cam 207 carried by the upper end of jaw base 187, the rotary cam being actuable by means of a handle 209. In accordance with this invention, rotary cam 207 fully moves jaw element 205 from its retracted to its locking position upon moving handle 209 (as shown by the arrow in FIG. 9) through an angle less than 180°.

In operation, stationary vise jaw 173 is pre-set to a desired angular position with respect to its bed plate 17. Movable jaw 181 is moved along the slot 189 until, with movable jaw element 205 in its retracted position, a work piece W may readily be inserted between the fixed and movable jaws. Then, handle 199 is movable vertically downwardly so as to lock the movable jaw with respect to the bed plate. With the work piece positioned relative to the bed so that the cutting edge of the lower reach of saw blade 147 will cut the work piece at a desired location, handle 209 is rotated so as to forceably move jaw element 205 from its retracted position into locking engagment with the work piece. After cutting of the work piece, the work piece may be released from vise 171 merely by moving handle 209 in the opposite direction through a relatively small angle less than 180° thereby to retract the jaw element and to permit moving of the work piece for the next cut. In this manner, it will be understood that upon cutting work of the same stock size, repositioning of the movable jaw is not required and it will further be appreciated that the work holding vise of the present invention does not require the operation of a rotary screw or the like for clamping the work piece on the bed.

As best shown in FIG. 2, a work stop 211 is movably mounted on a bar 213 extending outwardly in horizontal direction from bed channel 9b so as to be engagable with the end of a work piece W, such that the work piece extending out beyond the vertical plane of the lower reach of blade 47, a desired length of the work piece may readily be cut off. In this manner, work piece W merely need be pushed out beyond the ends of the vise so as to engage work stop 211 and then movable jaw element 205 moved to its clamping position thereby to lock the work piece relative to the bed with a predetermined length of the work piece extending out beyond the cutting plane of saw blade 47. It will be particularly noted that the above-described operation of vise 171 eliminates the need to manipulate any vise screw or the like to clamp and unclamp the work.

As indicated at 215, a switch actuator bracket is adjustably positioned on bed 3 for engagement with a limit switch or a mechanical link to a main switch (not shown) carried on the outer end of the head 3 for actuation of the limit switch upon lowering of the head to a predetermined level thereby to automatically deenergize motor 37 and to stop the sawing operation. Further, a coolant system including a coolant catch pan 217, and a coolant reservoir 219, a sump pump 221 may be provided for circulating coolant through tubing 223 metered by a valve 225 over the work and the blade as a cut is being made.

In view of the above, it will be seen that the several objects of this invention are achieved and other advantageous results obtained.

As various changes could be made in the above constructions without departing from the scope of the invention, it is intended that all matter contained in the above description or shown in the drawings shall be interpreted as illustrative and not in a limiting sense.

What is claimed is:

1. In a horizontal power band saw for cutting metal or the like comprising a frame including a bed, legs supporting said bed, and a head assembly pivotally carried by said bed at one end thereof for swinging in a generally vertical direction between a raised position and a lowered position, said head including a pair of spaced blade wheels rotatably mounted thereon, an endless blade entrained around said blade wheels, said blade having a cutting surface thereon, and means for driving said blade around said blade wheels, wherein the improvement comprises: said bed being a bed weldment constituted by a pair of elongate, generally parallel, spaced, horizontal bed members extending the length of said bed, each of said bed members being a channel member having a generally vertical web and a horizontal flange at the top and bottom of said web, said head comprising a head weldment having a head post and a head beam generally perpendicular to the head post, said head beam carrying said blade wheels, said head post extending down between said spaced bed members, said bed members being spaced apart a distance sufficient to receive the lower end of said head post therebetween, and means for pivotally mounting said head post relative to said bed members for rotation of the head about a horizontal axis between its raised and lowered positions, said means for mounting said head post relative to said bed members comprising a pair of horizontal, coaxial trunnions projecting outwardly from the head post on opposite sides thereof, the axis of said trunnions constituting a horizontal pivot axis for the head, and a pair of bearing housings, one for each trunnion, adjustably securable to the inner face of the web of said bed members for journalling said trunnions therein, each said bearing housing being adjustably movable within a limited range relative to its respective said bed member for adjusting said axis of said trunions thereby to properly orient said head relative to said bed.

2. In a band saw as set forth in claim 1 further including means for limiting axial end play movement of said head post relative to said bearing housings.

3. In a band saw for cutting metal or the like comprising a frame including a bed, legs supporting said bed, and a head assembly pivotally carried by said bed at one end thereof for swinging in a generally vertical direction between a raised portion and a lowered position, said head including a pair of spaced blade wheels rotatably mounted thereon, an endless blade entrained around said blade wheels, said blade having a cutting surface thereon, and means for driving said blade around said blade wheels, wherein the improvement comprises: said bed being constituted by a pair of elongate, generally parallel, spaced, horizontal bed members extending the length of said bed, each of said bed members having a generally vertical web, said head comprising a head post and a head beam generally perpendicular to the head post, said head beam carrying said blade wheels, said bed members being spaced apart a distance sufficient to receive the lower end of said head post therebetween, and means for pivotally mounting said head post relative to said bed members for rotation of the head about a horizontal axis between its raised and lowered positions, said saw further comprising adjustable means between said bed and said head for controlling the rate of downward movement of said head relative to said bed, this downward movement of the head constituting the feed rate of the saw, and adjustable spring means interconnecting said bed and said head post at a point below the level of said horizontal pivot axis of the head for counteracting the weight of said head which biases said head toward its lowered position.

4. In a band saw as set forth in claim 1 wherein one of said blade wheels, constituting a drive wheel, is powered by said drive means, and wherein the other of said blade wheels constitutes an idler wheel, said band saw further including means journalling said idler wheel, this last-said journal means being mounted on said head for limited swinging movement of said idler wheel through an arc generally toward and away from said drive wheel thereby to increase or decrease tension on said endless blade entrained around said blade wheels, and adjustable means for applying a desired tension load to said blade.

5. In a band saw as set forth in claim 4 wherein said blade tensioning means comprises a threaded member interconnecting said journal means and said head for effecting forceful swinging movement of said journal means toward and away from said drive wheel thereby to increase or decrease tension on said blade, and spring means interposed between said threaded member and said journal means for resiliently biasing said idler wheel in such direction as to tension the blade.

6. In a band saw as set forth in claim 5 wherein said blade tensioning means includes a scale and an indicator resiliently movable with said spring means relative to said scale for indicating the tension force applied to said blade whereby a predetermined tension force may be readily applied to said blade.

7. In a band saw for cutting metal or the like comprising a frame including a bed, legs supporting said bed, and a head assembly pivotally carried by said bed at one end thereof for swinging in a generally vertical direction between a raised position and a lowered position, said head including a pair of spaced blade wheels rotatably mounted thereon, an endless blade entrained around said blade wheels, said blade having a cutting surface thereon, and means for driving said blade around said blade wheels, said blade having an upper and a lower reach, wherein said improvement comprises: said band saw further including a pair of blade guides engagable with said lower reach of said blade and means for slidably mounting said blade guides on said head for movement in a direction generally parallel to the lower reach of the blade, said blade guides each being engagable with said lower reach for twisting the blade so that its cutting surface is oriented toward the work piece for accurately guiding and supporting the blade as it cuts the work piece, each of said blade guides comprising a pair of rollers disposed on opposite sides of said blade, each said guide roller being rotatable about a respective axis, a thrust bearing engagable with the edge of the blade opposite its cutting edge for the transfer of thrust loads from the blade to the blade guides upon cutting of a work piece, and a pair of guide inserts, one on each side of the blade, said guide inserts being slidably engagable with a respective side of the blade for holding the blade against twisting from a desired plane upon cutting a work piece, the peripheral surface of one of said guide rollers being engagable with said blade so as to constitute a reference for the portion of the blade extending between the blade guides, said other guide roller being adjustable movable toward and away from said one guide roller so that said other guide roller may be adjusted to insure that both said guide rollers are in rolling engagement with opposite sides of said blade.

8. In a band saw as set forth in claim 7 wherein said thrust bearing has a rotary axis, the latter being disposed on the same side of said blade on said stationary roller.

9. In a band saw as set forth in claim 7 wherein each of said guide inserts has a face slidably engagable with a respective side of said blade, and wherein one of said guide inserts on said one side of said blade is stationarily mounted with respect to said blade with the face of said one guide insert and said portion of the periphery of said one guide roller constituting a reference plane for guiding said blade, the other of said guide inserts being movable toward and away from said one guide insert for accommodating blades of various thicknesses.

10. In a band saw as set forth in claim 7 further including an eccentric mount for mounting said other guide roller on said blade guide, said eccentric mount permitting movement of said other guide roller toward and away from said one guide roller, and means for locking said eccentric mount relative to said blade guide with the other guide roller in engagement with said blade.

11. In a band saw as set forth in claim 7 wherein said guide rollers are offset vertically relative to one another so as to twist the blade through an angle of about 90° and to orient its cutting surface downwardly toward the work piece.

12. In a band saw as set forth in claim 7 wherein said guide rollers, thrust bearing, and guide inserts are carried on a base adjustably positionable relative to said blade thereby to accommodate a variety of blade locations and angles relative to the blade guide.

13. A band saw as set forth in claim 12 wherein said base is carried by said blade guide on opposite sides of the blade guide facing generally in the direction of the movement of the lower reach of the blade with said base being rotatably adjustable relative to the blade guide about an axis generally parallel to the direction of movement of the lower reach of the blade thereby to permit angular adjustment of the plane of the blade relative to the bed plate.

14. A band saw as set forth in claim 13 further comprising means carried by opposite end faces of the blade guide for supporting the base so as to permit independent heightwise adjustment of each end of said base relative to the blade guide thereby to adjust the plane of said thrust bearing so that it is parallel to the upper edge of the blade and so that said thrust bearing is in thrust transfer relation with the upper edge of the blade.

15. In a band saw as set forth in claim 14 wherein said base heightwise adjustment means comprises an eccentric cam carried by each of said end faces of said blade guide, said eccentric cams each being engagable with said base for moving one end of the base toward or away from the blade, said eccentric cams being lockable in a desired position thereby to fix one end of the base at a desired heightwise position with respect to the blade guide.

16. In a band saw as set forth in claim 12 wherein said blade guide includes a housing having an open lower end, said housing having a pair of end faces facing toward said blade wheels, said end faces each having a blind slot therein extending vertically from the bottom of the housing, said blind slots being generally in the plane of the lower reach of said blade as the blade extends between the blade guides, said base comprising a base plate carrying said guide rollers, said thrust bearing, and said guide inserts, said base plate being received in the open bottom face of said housing, and said base plate including a shaft carried thereby with the ends of the shaft extending out beyond the ends of the base plate and being received in said blind slots in said housing end faces, said base plate being rotatable about the axis of the said shaft, said blade guide further having locking means interconnecting said base plate and said housing for rigidity securing base plate to said housing at any desired angular position.

17. A band saw as set forth in claim 16 wherein said locking means comprises a lock bolt between said base plate and said housing which when tightened positively prevents rotation of said base plate with respect to said housing about the axis of said shaft.

18. In a band saw as set forth in claim 16 wherein said housing includes an eccentric cam on each of its end faces engagable with a respective end of said shaft received in a corresponding slot in said housing end face, said cam being eccentrically rotatable relative to said housing for selective engagement with said shaft at any desired position along said slot within a limited range independently of the cam at the other end face of the housing whereby the angle of the axis of said shaft with respect to the housing and hence the front-to-rear angle of the base plate may be adjusted.

19. In a band saw as set forth in claim 7 wherein said guide inserts each frictionally engage a respective side of said blade and said inserts are of carbide material so as to resist wear.

20. In a band saw as set forth in claim 1 further including a vise carried by said bed for holding a work piece to be cut by said blade, said vise including a jaw fixed with respect to said bed and another jaw movable relative to said bed and to said fixed jaw in a direction generally along the lower reach of said blade toward and away from said fixed jaw, said movable jaw including a jaw base carried by said bed, a jaw element, clamp means for securely fixing said jaw base to said frame at any desired position along a path of movement of said movable jaw relative to said bed, and cam actuating means mounting said jaw element along said jaw base, said cam actuating means being selectively actuable for forceably moving said jaw element toward and away from the work piece between an open position in which a work piece may be readily installed in or removed from the vise and a closed position in which both said fixed jaw and said movable jaw element are in gripping engagement with said work piece on opposite sides thereof.

21. A band saw as set forth in claim 20 wherein said bed further includes a bed plate secured to said bed members, said bed plate having a slot therein extending in a direction generally parallel to the lower reach of said blade, said jaw base sliding on the top of said bed plate and having a portion thereof slidably received in said slot for guiding said jaw base, and wherein said clamp means includes a clamp member carried by said jaw base below said bed plate and clamp actuator means for moving said clamp member toward and away from said bed plate for clamping said jaw base relative to said bed plate at any position along said slot and for unclamping said jaw base relative to said bed plate.

22. A band saw as set forth in claim 21 wherein the face of said clamp member engagable with the bottom of said bed plate is curved so as to result in increased clamping force between said clamp member and said bed plate upon actuation of said clamping means.

23. A band saw as set forth in claim 20 wherein said cam actuating means include a manually operable handling for moving said jaw element between its opened and closed positions upon rotation of said handle through an angle of less than approximately 180°.

24. A band saw as set forth in claim 21 wherein said fixed jaw is pivotally mounted on said bed plate and may be pivoted on said bed plate to a desired angular position, said fixed jaw further comprising said clamp means cooperable with said bed plate for locking said fixed jaw with respect to said bed plate in said desired angular position.

* * * * *